United States Patent [19]

Medeiros et al.

[11] Patent Number: 5,236,790
[45] Date of Patent: Aug. 17, 1993

[54] RESTORED MAGNETIC RECORDING MEDIA AND METHOD OF PRODUCING SAME

[75] Inventors: Desmond A. Medeiros, Mountain View, Calif.; John L. S. Curtis, Karlsruhe, Fed. Rep. of Germany; Robert H. Perry, San Carlos, Calif.; Justin D. Underwood, Crowthorne Berkshire, England

[73] Assignee: Ampex Systems Corporation

[21] Appl. No.: 331,709

[22] Filed: Mar. 31, 1989

[51] Int. Cl.$^5$ .................. B05D 5/12; B32B 35/00; G11B 5/66; B65D 85/30

[52] U.S. Cl. .................. 428/694 b; 206/444; 427/130; 427/140; 427/372.2; 427/377; 427/384; 428/900

[58] Field of Search ............ 428/694, 900; 427/140, 427/130, 372.2, 384, 377; 206/444

[56] References Cited

U.S. PATENT DOCUMENTS

| | | | |
|---|---|---|---|
| 3,049,442 | 8/1962 | Haines et al. | 427/130 |
| 3,216,846 | 11/1965 | Hendricx et al. | 427/130 |
| 3,625,849 | 12/1971 | Rogalla | 204/192 |
| 3,976,822 | 8/1976 | Thomas et al. | 428/500 |
| 4,100,326 | 7/1978 | Somezawa | 427/130 |
| 4,272,563 | 6/1981 | Steck et al. | 427/130 |
| 4,416,947 | 11/1983 | Yoda et al. | 360/135 |
| 4,416,948 | 11/1983 | Ohkawa et al. | 360/135 |
| 4,446,170 | 5/1984 | Watanabe | 427/130 |
| 4,474,832 | 10/1984 | Shirahata et al. | 427/130 |
| 4,495,241 | 1/1985 | Iijima | 428/328 |
| 4,585,697 | 4/1986 | Kato et al. | 360/135 |
| 4,661,377 | 4/1987 | Morita et al. | 427/130 |
| 4,663,193 | 5/1987 | Endo et al. | 427/129 |
| 4,741,923 | 5/1988 | Goulding | 427/130 |

OTHER PUBLICATIONS

Japanese Patent Abstract, vol. 6, No. 255, p. 39 P 162, Dec. 14, 1982, Kokai-no. 57-150 175.
Japanese Patent Abstract, vol. 7, No. 57, p. 58 P 181, Mar. 9, 1983, Kokai-no. 57-203 268.
Declaration of Knowledge and Use Outside the United States of Heat Treatment of Magnetic Media to Restore Same.

*Primary Examiner*—Paul J. Thibodeau
*Assistant Examiner*—Leszek Kiliman
*Attorney, Agent, or Firm*—Gene Dillahunty; Ralph L. Mossino; Richard C. Liu

[57] ABSTRACT

Deteriorated or aged magnetic recording media exhibiting undesirable properties such as shed, stickiness or squeal are restored to playable condition having no such objectionable properties by heating the media to an elevated temperature and for lengths of time sufficient to restore the media. A typical temperature used is 54° C. and a typical effective time is 16 hours. Ambient humidity is suitable. The restored media can be used to transfer data or information to new media. Restored media can also be again heat treated for restoration purposes, if it deteriorates again.

8 Claims, No Drawings

RESTORED MAGNETIC RECORDING MEDIA AND METHOD OF PRODUCING SAME

BACKGROUND OF THE INVENTION

This invention relates to restored magnetic recording media and methods for restoring magnetic recording media which have become unusable due to age and deterioration of the magnetic coating on the base film.

This invention relates to magnetic recording media in general but is discussed herein in terms of magnetic recording tape. It is to be understood that the discussion of magnetic recording tape applies to tapes for the storage of various kinds of information, such as audio or video signals, as well as to other forms of magnetic recording media such as disks.

Some magnetic tapes deteriorate slowly over a number of years, and eventually exhibit the undesirable properties of stickiness and excessive shed of the magnetic oxide coating layer. These properties usually prevent the use of the tapes in equipment for recording or playback. Magnetic tapes currently in use have exhibited these undesirable properties within 7 years of their manufacture. When a tape exhibits these undesirable properties, often the information on the tape cannot be recovered and is sometimes lost. For example, excessive shed of the magnetic oxide recording layer can cause the heads in the equipment to clog, which prevents playback of the information recorded on the tape. Also, stickiness of the tape frequently leads to friction build-up in the tape path, which can cause erratic changes in the speed of transport of the tape that makes the tape unplayable. Stickiness of the tape and exudations from the magnetic coating, such as lubricants, often produce during playback tape induced noise in the form of a high frequency squeal.

It is an object of this invention to provide a method of restoring such deteriorated tape so it can be used in the appropriate equipment for playback to recover the information originally recorded on the magnetic recording tape. It is a further object of this invention to provide restored magnetic recording media from magnetic recording media which has become unusable due to deterioration, undesirable shedding and/or undesirable stickiness.

SUMMARY OF THE INVENTION

This invention provides restored magnetic recording media formed by subjecting deteriorated magnetic recording media, exhibiting undesirable properties of shed, stickiness and/or squeal, to a treatment which comprises maintaining the media at a sufficiently elevated temperature for a sufficient length of time to restore the media to playable condition that does not exhibit such undesirable properties.

In another aspect this invention is a method of restoring deteriorated magnetic recording media, exhibiting undesirable properties of shed, stickiness and/or squeal, by subjecting the media to treatment which comprises maintaining the media at a sufficiently elevated temperature for a sufficient length of time to restore the media to playable condition that does not exhibit such undesirable properties.

In a more particular aspect this invention is a method of heat treating magnetic recording media comprising maintaining the magnetic recording media at a sufficiently elevated temperature for a sufficient time to overcome the adverse consequences of undesirable shed, stickiness or squeal and restore the media to a playable condition. The elevated temperature required and the time required to do so depends on the severity of the undesirable properties of the media. To insure that the adverse consequences are overcome, a temperature of at least 50° C. for at least 8 hours is recommended. However, lower temperatures and/or shorter times can restore media sufficiently to enable playback from a deteriorated media for purposes of making a new recording of the information on another unimpaired recording medium for subsequent use. For example, magnetic tape has been restored sufficiently to enable playback of recorded information after subjecting it to a temperature of 54° C. for about 3 hours.

DESCRIPTION OF THE INVENTION

Magnetic recording media such as tape comprises a magnetic pigmented coating, such as a metal oxide, on a base film that usually also has a back coat on the opposite side of the base film. Formulations for the magnetic coating applied to the base film vary widely and are well known in the art. Typically, a magnetic oxide coating contains about 40 to 55% by volume magnetic material, with the balance of the coating comprising resin binders, lubricants, dispersants, and other materials. While such magnetic recording tape is generally considered "permanent" and in many cases may exhibit no degradation or significant loss of properties for many years, the organic materials contained in the magnetic coating of current tape inherently and unavoidably are susceptible to change, degradation, migration and exudation over time, dependent on storage conditions.

For example, a number of common binders used by the tape manufacturers comprise thermoplastic polyester or polyester-urethane polymer systems containing various other polymers such as polyvinylchloride, polyvinylacetate, polyphenoxy or cellulose nitrate. These polymers can react with water from atmospheric moisture to break the ester linkages contained in such polymeric chains and form lower molecular weight polymers, a process known as hydrolysis. When a sufficient number of such bonds have been hydrolyzed and broken, the binder becomes undesirably weakened due to degeneration of molecular weight. The breakdown compounds of this weakened binder migrate, can exude from the coating thus causing the tape to be sticky and to shed. In addition, because of the change in the binder polymer system, the compatibility with other components present, such as lubricants and dispersants, also changes which may cause these components to migrate and exude as well. Another consequence of the change in the binder system is the change in the effectiveness and strength of the binder relative to its ability to maintain the metal oxide particles in place, on the base film. If there is sufficient loss of binder strength then the magnetic oxide coating can be released from the base film during use of the tape in recording or playback equipment. When the magnetic coating is released from the base film while in use in the recording and playback equipment, it collects on the recording and playback heads in the equipment as well as other components along the tape path, and can clog the heads and also impede the transport of the tape in the equipment. This releasing of the coating is known as shed and is an extremely undesirable property in magnetic recording media. In addition to the above, other degradation mechanisms can occur in various forms of tapes, such as by oxidation, loss of lubricant or other additives by migration, and other mechanisms.

In this invention it has been unexpectedly found that deteriorated magnetic recording media exhibiting an undesirable degree of shed, stickiness and/or squeal, can be restored to playable and excellent quality media by heat treatment at a sufficiently elevated temperature for a sufficiently long time to restore the media to playable condition exhibiting none of these undesirable properties. It has surprisingly been found that such heat treatment does not further deteriorate the tape, but to the contrary restores the tape to playable condition by eliminating objectionable shedding, stickiness and squealing. It has also surprisingly been found that the heat treatment according to this invention can be carried out with the magnetic recording media such as tape in its cassette, on its reel or retained by other tape housings without causing the layers of the tape to stick together, in the cassette, on the reel or in other housings. After the heat treatment, according to this invention, the tape is nonsticky, exhibits little if any shed and is usable in the recording and playback equipment as desired.

While not wishing to be bound by theory, it is believed that the heat restoration process according to this invention, to some extent, may reverse certain hydrolysis which may have occurred in the binder polymers and may cause the components which had migrated to the tape surface to be reabsorbed by the coating from which they originally diffused, thus producing the restored tape which is not sticky, which does not exhibit significant shed and is again usable for recording and playback as intended.

While this invention is discussed in terms of magnetic oxide coated tape and recording media, it is to be understood that this invention may also be applicable to other forms of magnetic recording media such as that in which the magnetic coating is deposited by vacuum deposition. The present invention may be beneficial in treating these magnetic recording media to the extent that coatings applied to this type of media contain organic components, which can possibly degrade and migrate or exude from their original position in the media structure.

The process of this invention involves dry heat treatment for relatively long periods of time. The temperature which has been found effective in the present invention is at least 50° C., preferably at least about 54° C. The time which has been found effective for the heat treatment according to the present invention is at least about 3 hours, preferably at least about 8 hours and in some instances as long as at least 24 hours. The best results are frequently obtained when the heat treatment is continued for about 12 or 16 hours or more at a temperature in excess of at least about 50° C.

It is desired that the relative humidity present during the heat treatment be comparatively low such as 15% relative humidity or lower, which typically is ambient relative humidity when ambient air is heated to the preferred temperatures used in the practice of the present invention.

The temperature used in the practice of the present invention should not exceed a level which would be likely to deteriorate or decompose the various components in the media coatings or the base films. Likewise, the time during which the recording media is subjected to the elevated temperature should merely be sufficient to restore the tape to playable condition and should not be so long as to cause degradation of any of the components of the tapes.

It has been observed that restoring magnetic tapes according to the present invention produces a restored tape that remains in a usable condition for a number of weeks or months. However, it can be expected that an aged magnetic recording media, even after restoring according to the present invention, is likely to revert back to its deteriorated condition over time. However, one of the greatest benefits of the present invention is deteriorated magnetic recording media can be restored to playable condition so that the music, video images or other information on the recording media can then be transferred to a new, unimpaired media while the restored recording media is in its best restored condition. Thus, it can be seen that the method according to the present invention and the restored media produced according to the present invention have great value in terms of preventing the loss of audio, video or other information recordings.

One of the advantages of this invention is that it can be practiced with the use of a standard portable consumer convection oven, which can conveniently be brought to the site where the deteriorated media are located. Thus, media can be restored on-site, with the use of inexpensive, readily available equipment without the need to transport the media to another facility, then duplicated on new media in order to save the information stored thereon. The benefits of the aforedescribed invention can best be illustrated and appreciated by the following exemplary embodiments.

EXAMPLE 1

In this example, a magnetic recording tape tested was a quarter inch tape having audio information recorded thereon, which was approximately 10 years of age. The tape was heat treated at 54° C. for the time indicated. This example shows that the minimum time required to restore the deteriorated tape is at least about 3 to 4 hours.

TABLE 1

| TREATMENT TIME | PROPERTIES OBSERVED ON RUNNING THE TAPE ON AN ATR 102 MODEL AUDIO TAPE RECORDER MANUFACTURED BY AMPEX CORPORATION |
| --- | --- |
| 1 Hr. | Test terminated after 4 min., 15 dB bounce, audible squeal. Oxide shed found. |
| 2 | Test terminated after 15 min., 7 dB bounce, audible squeal after 5 min. Heavy oxide shed. |
| 4 | Tape played end to end with no shed, no audible squeal and no significant dB bounce. |
| 8 | Tape played end to end with no shed, no audible squeal and no significant dB bounce. |
| 16 | Tape played end to end with no shed, no audible squeal and no significant dB bounce. |

EXAMPLE 2

In this example, the same type of 10 year old, quarter inch magnetic recording tape of Example 1 was used and also tested upon the ATR 102 audio tape recorder. This example shows that the restored tape will revert to its deteriorated condition after some period of time.

TABLE 2

| LENGTH OF TIME AFTER HEAT TREATMENT | PERFORMANCE |
| --- | --- |
| Before first heat treatment | Failed |
| 1 day after first heat treatment | Passed |
| 1 month after first heat treatment | Passed |
| 4 months after first heat treatment | Failed |
| 1 day after second heat treatment performed on the above tape following the 4 month period after the first heat treatment | Passed |

In all tests for this example, the tape was heated at 54° C. for 16 hours under ambient humidity (about 15% relative humidity).

As can be seen from these examples, the heat treatment of deteriorated magnetic recording media in accordance with the present invention alters the media to eliminate objectionable shed, stickiness and squeal, and thereby enable recovery of information recorded thereon. As will be appreciated, this surprising result of heat treating magnetic recording media provides the ability of preserving recorded information, which in the absence of a duplicate copy would otherwise be lost. While the present invention has been described with reference to certain specific examples, it will be appreciated that the beneficial results of the invention can be realized with other embodiments within the scope of the following claims.

We claim:

1. A method of heat treating magnetic recording media comprising maintaining the magnetic recording media at a temperature of at least about 50° C. for a time of at least about 3 hours;
    wherein the magnetic recording media includes a layer which comprises magnetic particles and a binder, and further wherein the magnetic recording media has information recorded thereon.
2. A method according to claim 1 wherein the temperature is at least about 54° C. and the time is at least 4 hours.
3. A method according to claim 1 wherein the time is at least about 8 hours.
4. A method according to claim 1 wherein the time is at least about 12 hours.
5. A method according to claim 1 wherein the media is tape retained by a housing.
6. A method according to claim 1 wherein the humidity is maintained at about 15% relative humidity.
7. A method according to claim 3 wherein the temperature is at least about 54° C.
8. A method according to claim 4 wherein the temperature is at least about 54° C.

* * * * *